(12) United States Patent
Griffin

(10) Patent No.: US 10,110,314 B2
(45) Date of Patent: Oct. 23, 2018

(54) ELECTRONICAL COMPENSATION OF AN INTERLEAVER TRANSFER FUNCTION FOR OPTICAL MULTIPLE CARRIER TRANSMISSION

(71) Applicant: Oclaro Technology Limited, Northamptonshire (GB)

(72) Inventor: Robert Griffin, Northamptonshire (GB)

(73) Assignee: OCLARO TECHNOLOGY LIMITED, Northamptonshire (GB)

( * ) Notice: Subject to any disclaimer, the term of this patent is extended or adjusted under 35 U.S.C. 154(b) by 0 days.

(21) Appl. No.: 15/577,286

(22) PCT Filed: May 27, 2016

(86) PCT No.: PCT/GB2016/051552
§ 371 (c)(1),
(2) Date: Nov. 27, 2017

(87) PCT Pub. No.: WO2016/193685
PCT Pub. Date: Dec. 8, 2016

(65) Prior Publication Data
US 2018/0159630 A1   Jun. 7, 2018

(30) Foreign Application Priority Data
May 29, 2015   (GB) .................................. 1509256.2

(51) Int. Cl.
*H04B 10/00* (2013.01)
*H04B 10/12* (2006.01)
(Continued)

(52) U.S. Cl.
CPC ....... *H04B 10/516* (2013.01); *G02B 6/29352* (2013.01); *G02B 6/29386* (2013.01);
(Continued)

(58) Field of Classification Search
CPC .... H04B 10/516; H04B 10/69; H04B 10/572; H04B 10/077; H04B 10/556;
(Continued)

(56) References Cited

U.S. PATENT DOCUMENTS

| 6,591,034 B1 * | 7/2003 | Albrecht ............ G02B 6/12016 385/24 |
| 6,909,531 B2 * | 6/2005 | Frignac .............. G02B 6/29358 359/279 |

(Continued)

FOREIGN PATENT DOCUMENTS

| EP | 2 634 944 A1 | 9/2013 |
| EP | 2 733 879 A1 | 5/2014 |

(Continued)

OTHER PUBLICATIONS

Intellectual Property Office of the United Kingdom, Patents Act 1977: Search Report under Section 17(5) for Application No. GB1509256.2, dated Dec. 1, 2015, 4 Pages.

(Continued)

*Primary Examiner* — Ken N Vanderpuye
*Assistant Examiner* — Abbas H Alagheband
(74) *Attorney, Agent, or Firm* — Fenwick & West LLP

(57) ABSTRACT

There is described a transmitter device for transmitting an optical signal in the form of a plurality of subcarrier channels having different wavelengths. The device comprises first and second optical carrier emitters for emitting light in first and second subcarriers at first and second frequencies or polarizations respectively. First and second modulators are provided for modulating the first and second subcarriers with first and second modulation signals. An interleaver is provided for interleaving the first and second modulated subcarriers into the optical signal. First and second digital signal processing units are configured to pre-emphasize the (Continued)

first and second modulation signals to compensate for a wavelength-dependent power transfer function of the interleaver.

9 Claims, 4 Drawing Sheets

(51) Int. Cl.
| | | |
|---|---|---|
| H04B 10/516 | (2013.01) | |
| H04B 10/2507 | (2013.01) | |
| H04B 10/58 | (2013.01) | |
| H04B 10/69 | (2013.01) | |
| G02B 6/293 | (2006.01) | |
| H04Q 11/00 | (2006.01) | |
| H04B 10/077 | (2013.01) | |
| H04B 10/572 | (2013.01) | |
| H04J 14/02 | (2006.01) | |
| H04J 14/06 | (2006.01) | |
| H04L 1/00 | (2006.01) | |
| H04B 10/073 | (2013.01) | |
| H04B 10/294 | (2013.01) | |
| H04B 10/556 | (2013.01) | |

(52) U.S. Cl.
CPC ....... *H04B 10/077* (2013.01); *H04B 10/2507* (2013.01); *H04B 10/572* (2013.01); *H04B 10/58* (2013.01); *H04B 10/69* (2013.01); *H04B 10/697* (2013.01); *H04J 14/0208* (2013.01); *H04J 14/06* (2013.01); *H04L 1/0071* (2013.01); *H04Q 11/0001* (2013.01); H04B 10/0731 (2013.01); H04B 10/2941 (2013.01); H04B 10/556 (2013.01)

(58) Field of Classification Search
CPC ............ H04B 10/0731; H04B 10/2941; H04J 14/0208; H04J 14/06; G02B 6/29386; G02B 6/29352; H04L 1/0071
USPC ........................................ 398/140, 147, 188
See application file for complete search history.

(56) References Cited

U.S. PATENT DOCUMENTS

| 7,409,121 | B2* | 8/2008 | Doerr ................ G02B 6/12021 |
| --- | --- | --- | --- |
| | | | 385/15 |
| 7,826,752 | B1* | 11/2010 | Zanoni ............... H04B 10/5055 |
| | | | 398/186 |
| 8,098,996 | B2* | 1/2012 | Lyubomirsky ..... H04B 10/5167 |
| | | | 398/183 |
| 8,374,514 | B2* | 2/2013 | Huang .................. H04B 10/60 |
| | | | 398/163 |
| 8,638,489 | B2 | 1/2014 | Duthel et al. |
| 8,644,420 | B2 | 2/2014 | Khatana et al. |
| 9,479,247 | B2* | 10/2016 | Yu ..................... H04B 10/2507 |
| 9,584,223 | B2* | 2/2017 | Chien ................. H04B 10/506 |
| 2003/0020989 | A1* | 1/2003 | Liu .................... H04B 10/0731 |
| | | | 398/147 |
| 2003/0090672 | A1* | 5/2003 | Gu ........................ G02B 6/272 |
| | | | 356/484 |
| 2008/0240736 | A1* | 10/2008 | Ji ........................ H04B 10/677 |
| | | | 398/202 |
| 2009/0162066 | A1* | 6/2009 | Ji ....................... G02B 6/29335 |
| | | | 398/79 |
| 2009/0297144 | A1* | 12/2009 | Djordevic .......... H04B 10/2569 |
| | | | 398/39 |
| 2010/0021166 | A1* | 1/2010 | Way ...................... H04J 14/02 |
| | | | 398/79 |
| 2010/0054738 | A1* | 3/2010 | Yuki ...................... H04J 14/06 |
| | | | 398/65 |
| 2011/0020010 | A1* | 1/2011 | Bruno ............... H04B 10/2942 |
| | | | 398/158 |
| 2011/0052189 | A1* | 3/2011 | Yamada .............. H04J 14/0279 |
| | | | 398/42 |
| 2012/0121264 | A1 | 5/2012 | Chung et al. |
| 2012/0243878 | A1 | 9/2012 | Wurth et al. |
| 2012/0308236 | A1 | 12/2012 | Chang et al. |
| 2013/0142510 | A1* | 6/2013 | Zhou ................... H04J 14/0208 |
| | | | 398/48 |
| 2013/0177316 | A1* | 7/2013 | Cardakli ................. H04J 14/06 |
| | | | 398/79 |
| 2013/0279912 | A1 | 10/2013 | Lyubomirsky et al. |
| 2013/0330070 | A1* | 12/2013 | Yu ...................... H04B 10/2507 |
| | | | 398/16 |
| 2014/0086574 | A1* | 3/2014 | Gariepy ............. H04B 10/0795 |
| | | | 398/26 |
| 2014/0147117 | A1 | 5/2014 | Kikuchi |
| 2014/0363159 | A1* | 12/2014 | Chien ................. H04B 10/506 |
| | | | 398/43 |
| 2015/0043919 | A1 | 2/2015 | Handelman |
| 2016/0036533 | A1* | 2/2016 | Nakashima ........... G02F 1/0123 |
| | | | 398/187 |
| 2017/0264368 | A1* | 9/2017 | Eiselt ..................... H04B 10/69 |

FOREIGN PATENT DOCUMENTS

| JP | 2014107736 | 6/2014 |
| --- | --- | --- |
| JP | 2015008388 | 1/2015 |
| JP | 2015012392 | 1/2015 |

OTHER PUBLICATIONS

Patent Cooperation Treaty, International Search Report, International Patent Application No. No. PCT/GB2016/051552, dated Aug. 30, 2016, 4 Pages.

Patent Cooperation Treaty, Written Opinion of the International Searching Authority, International Patent Application No. No. PCT/GB2016/051552, dated Aug. 30, 2016, 7 Pages.

Wang, Junyi et al., "Generation of Spectrally Efficient Nyquist-WDM QPSK Signals Using Digital FIR or FDE Filters at Transmitters," Lightwave Technologies, vol. 30, No. 23, Dec. 1, 2012, pp. 3679-3686.

Wang, Junyi et al., "Generate Nyquist-WDM Signal Using a DAC With Zero-Order Holding at the Symbol Rate," Lightwave Technologies, vol. 32, No. 24, Dec. 15, 2014, pp. 4487-4693.

* cited by examiner

ELECTRONICAL COMPENSATION OF AN INTERLEAVER TRANSFER FUNCTION FOR OPTICAL MULTIPLE CARRIER TRANSMISSION

RELATED APPLICATIONS

This application is a 35 U.S.C. 371 national stage filing of International Application No. PCT/GB2016/051552, filed on May 27, 2016, which claims priority from United Kingdom Application No. GB1509256.2 filed on May 29, 2015. The contents of the aforementioned applications are hereby incorporated by reference in their entireties.

TECHNICAL FIELD

The present invention relates to a multiple carrier system for transmitting a signal as a plurality of subcarriers. In particular, although not exclusively, the invention relates to a system for interleaving and de-interleaving multiple subcarriers.

BACKGROUND

To meet the dramatic growth in Internet demand, the optical industry must find new methods to increase the total capacity of existing fibre networks and ensure these new technologies are economically efficient, operationally simple, and scalable.

As optical data transmission speeds increase and optical transmission is promoted for short distances such as in data centres, it becomes more important to push more data through fibres. For very high transmission speeds it becomes unrealistic to transmit over a single carrier. For example, for 1 Tb/s transmission, even with 100 GS/s Analogue to Digital Conversion (ADC) technology, very sophisticated quadrature amplitude modulation (PM-1024QAM) would be required. This leads to poor sensitivity, phase noise issues, an impact on non-linearity, hardware problems, and a very short reach.

The solution is for information to be distributed over a few subcarriers spaced as closely as possible, together forming a "superchannel". Each subcarrier can work at a lower rate which is compatible with current ADCs and Digital Signal Processors (DSPs).

A concept widely discussed for achieving very high transmission speeds is flexible wavelength transmission (sometimes known as flexgrid). For 400 G transmission, dual polarisation quadrature phase shift keying with 4 subcarriers and DP-16 quadrature amplitude modulation (QAM) with two subcarriers are options under consideration. These options become spectrally efficient by matching the channel size with the bandwidth of the signal being transmitted.

However, where a number of subcarriers are used, their signals need to be combined before transmission into the optical fibre, so that all of the subcarriers are multiplexed. Similarly, in a receiver the subcarriers need to be demultiplexed. This can be carried out using passive splitters/combiners, which could be incorporated into the modulator chip, but such components are relatively lossy. An alternative is to use multiplexers/demultiplexers external to the chip, but this increases the footprint of the transmitter or receiver.

SUMMARY

In accordance with one aspect of the present invention there is provided a transmitter device for transmitting an optical signal in the form of a plurality of subcarrier channels having different wavelengths. The device comprises first and second optical carrier emitters for emitting light in first and second subcarriers at first and second frequencies or polarisations respectively. First and second modulators are provided for modulating the first and second subcarriers with first and second modulation signals. An interleaver is provided for interleaving the first and second modulated subcarriers into the optical signal. First and second digital signal processing units are configured to pre-emphasise the first and second modulation signals to compensate for a wavelength-dependent power transfer function of the interleaver.

The interleaver may be a Mach-Zehnder interleaver, and may have a sinusoidal (e.g. raised cosine) power transfer function.

The first and second digital signal processing units may be configured to pre-emphasise the signal such that the subcarrier channels in the optical signals have a substantially flat topped profile.

In accordance with another aspect of the present invention there is provided a receiver device for a receiving an optical signal in the form of a plurality of subcarrier channels having different wavelengths. The device comprises a de-interleaver for receiving the optical signal and de-interleaving it into first and second subcarrier signals. First and second optical receivers are provided for receiving and decoding the first and second subcarrier signals respectively so as to generate first and second electrical signals. First and second digital signal processing devices are configured to process the first and second electrical signals to compensate for a wavelength-dependent power transfer function of the de-interleaver.

The de-interleaver may be a Mach-Zehnder interleaver, and may have a sinusoidal (e.g. raised cosine) power transfer function.

In accordance with another aspect of the present invention there is provided a method of transmitting an optical signal in the form of a plurality of subcarrier channels having different wavelengths. The method comprises generating light in first and second subcarriers at first and second frequencies or polarisations respectively, modulating the first and second subcarriers with first and second modulation signals, and interleaving the first and second modulated subcarriers into the optical signal using an interleaver. The method also comprises pre-emphasising the first and second modulation signals to compensate for a wavelength-dependent power transfer function of the interleaver.

In accordance with another aspect of the present invention there is provided a method of receiving an optical signal in the form of a plurality of subcarrier channels having different wavelengths. The method comprises de-interleaving the signal into first and second subcarrier signals using a de-interleaver, decoding the first and second subcarrier signals respectively so as to generate first and second electrical signals, and processing the first and second electrical signals at digital signal processing components to compensate for a wavelength-dependent power transfer function of the de-interleaver.

BRIEF DESCRIPTION OF THE DRAWINGS

Some preferred embodiments of the invention will now be described by way of example only and with reference to the accompanying drawings, in which.

DETAILED DESCRIPTION

Figure 1:
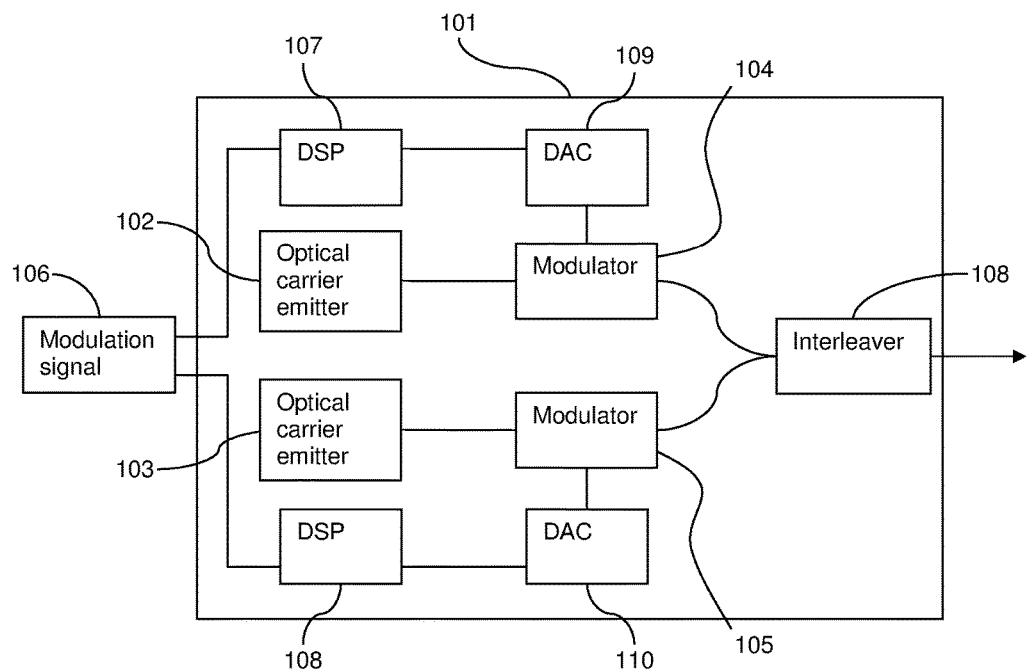
FIG. 1 is a schematic illustration of a transmitter device.

FIG. 1 is a schematic illustration of a transmitter device. The device is formed as a photonic integrated circuit (PIC) 101 having mounted thereon two optical carrier emitters 102, 103 (e.g. tuneable lasers) for emitting optical carriers at different wavelengths and/or polarisations. Light from each carrier emitter is transmitted to a corresponding modulator 104, 105. Each modulator has applied thereto an electrical modulation signal which has passed through a Digital Signal Processing (DSP) unit 107, 108 and a DAC 109, 110. The signal bearing light from each modulator is transmitted to an interleaver 108 which may be a Mach-Zehnder (MZ) interleaver. The output from the interleaver is transmitted from the PIC into an optical fibre (not shown).

Figure 2:
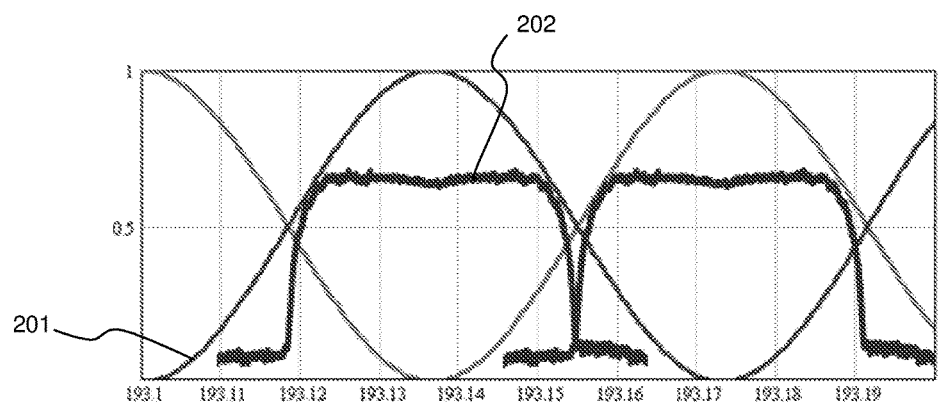
FIG. 2 is an illustration of a power transfer function of a Mach-Zehnder Interleaver.

FIG. 2 illustrates the power transfer function 201 with respect to frequency of a simple Mach-Zehnder interleaver. The response follows a raised-cosine function. In practice, it is desirable to transmit each optical subcarrier channel as tightly defined bands that are closely spaced: an example 202 is shown in FIG. 2. When applied to the MZ interleaver, the frequency bands will be spectrally-shaped by the interleaver response, degrading performance. It is possible to engineer MZ interleavers to provide a more desirable frequency response, but this increases the complexity and cost of the interleaver.

It is therefore possible, instead of attempting to optimise the interleaver, to optimise the electrical signal passed to the modulators so as to control the spectrum of the signal as it reaches the interleaver. This is carried out by digital signal processing of the signal passed to the modulators 104, 105 by the DSP units 107, 108. The DSP units are configured to pre-emphasise the signal spectrum at frequencies near the edge of each subcarrier band relative to the centre, so as to compensate for the raised-cosine shape of the interleaver power transfer function.

It will be appreciated that the optical carrier emitters 102, 103 need not be separate lasers. Other arrangements may also be suitable. For example, one or more lasers (not shown) external to the PIC may be used to provide light, which is launched as two carriers by the carrier emitters 102, 103.

Figure 3:
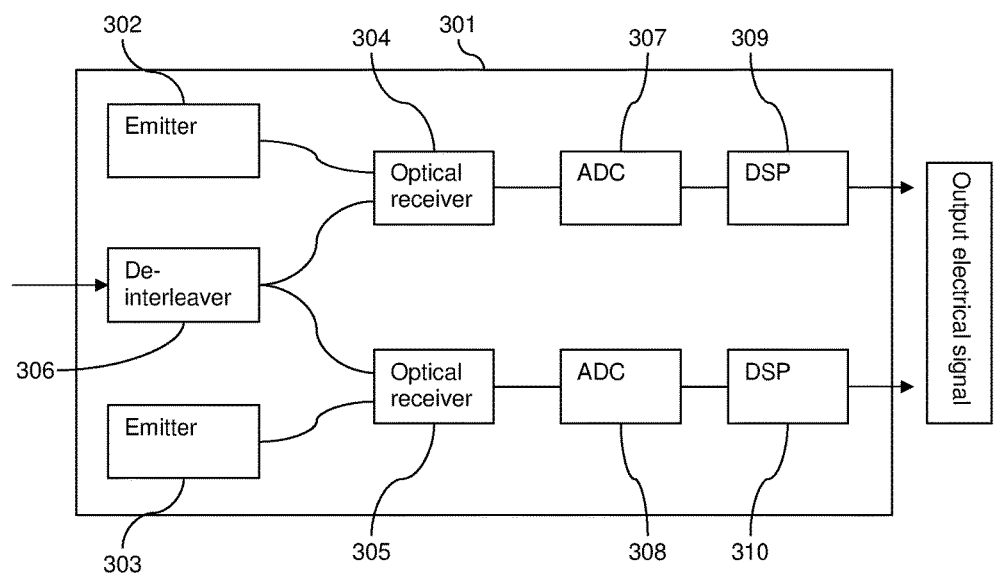
FIG. 3 is a schematic illustration of a receiver device.

FIG. 3 is a schematic illustration of a receiver device. The device is formed as a PIC 301 having mounted thereon two emitters 302, 303, for example (optionally tuneable) lasers, for generating light at different wavelengths and/or polarisations. As with the transmitter, light may also be provided externally. Light from each emitter is transmitted to a corresponding optical receiver 304, 305. A de-interleaver 306 (again, optionally a MZ de-interleaver) receives a signal from an optical fibre (not shown) and de-interleaves subcarriers from the signal. The subcarriers are sent to the optical receivers 304, 305. The optical receivers 304, 305 decode the subcarrier signals in combination with the light from the lasers 302, 303. The decoded signals are passed to ADCs 307, 308 and thence to DSPs 309, 310 for further processing. As with the transmitter, the de-interleaver may be a simple de-interleaver with a sinusoidal power transfer function, and the DSP can be used to compensate for this.

It will be appreciated that more than two carriers can be interleaved or de-interleaved in this way: all that is required is suitable nesting of components, for example in a branched structure. More than one polarisation state can also be accommodated. For convenience, modulation can be performed with a common state of polarisation, but subsequently the polarisation of individual subcarriers can be manipulated on the PIC or by using micro-optics as part of the launch optics.

Figure 4:
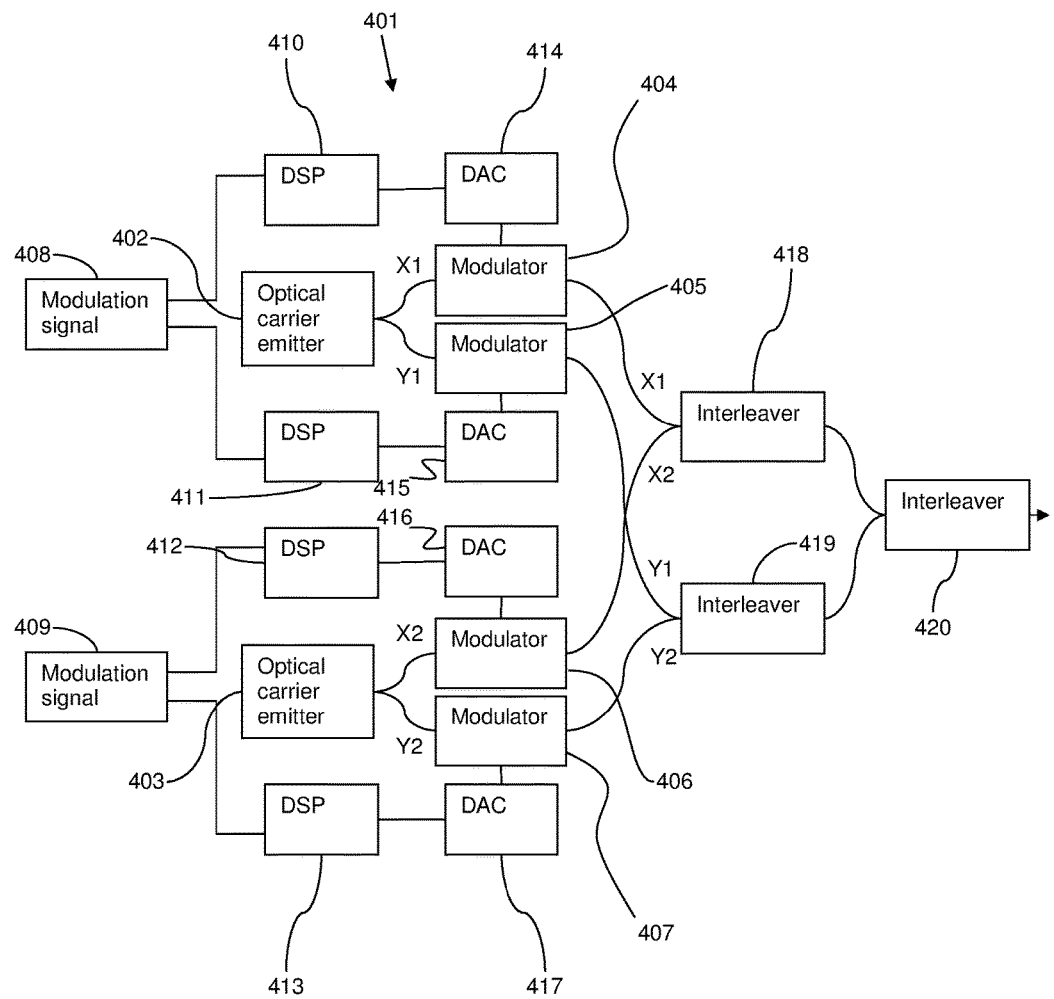
FIG. 4 is a schematic illustration of an alternative transmitter device.

A suitable arrangement for a dual-carrier dual-polarisation transmitter 401 is shown in FIG. 4. The transmitter 401 is similar to the transmitter 101 shown in FIG. 1, and comprises two optical carrier emitters 402, 403 transmitting at different wavelengths. The light from each emitter is split into two paths, and the light in one of the two paths from each emitter is rotated by any known means (not shown), so as to produce four carriers X1, X2, Y1, Y2, each having a different wavelength/polarisation combination, and each transmitted to a corresponding modulator 404, 405, 406, 407. As in FIG. 1, each modulator has applied thereto an electrical modulation signal 408, 409 which has passed through a DSP unit 410, 411, 412, 413 and DAC 414, 415, 416, 417. The signal bearing light from each modulator is transmitted to interleavers 418, 419 and then to a final interleaver 420. The output from the interleavers is transmitted from the PIC into optical fibres (not shown).

Figure 5:
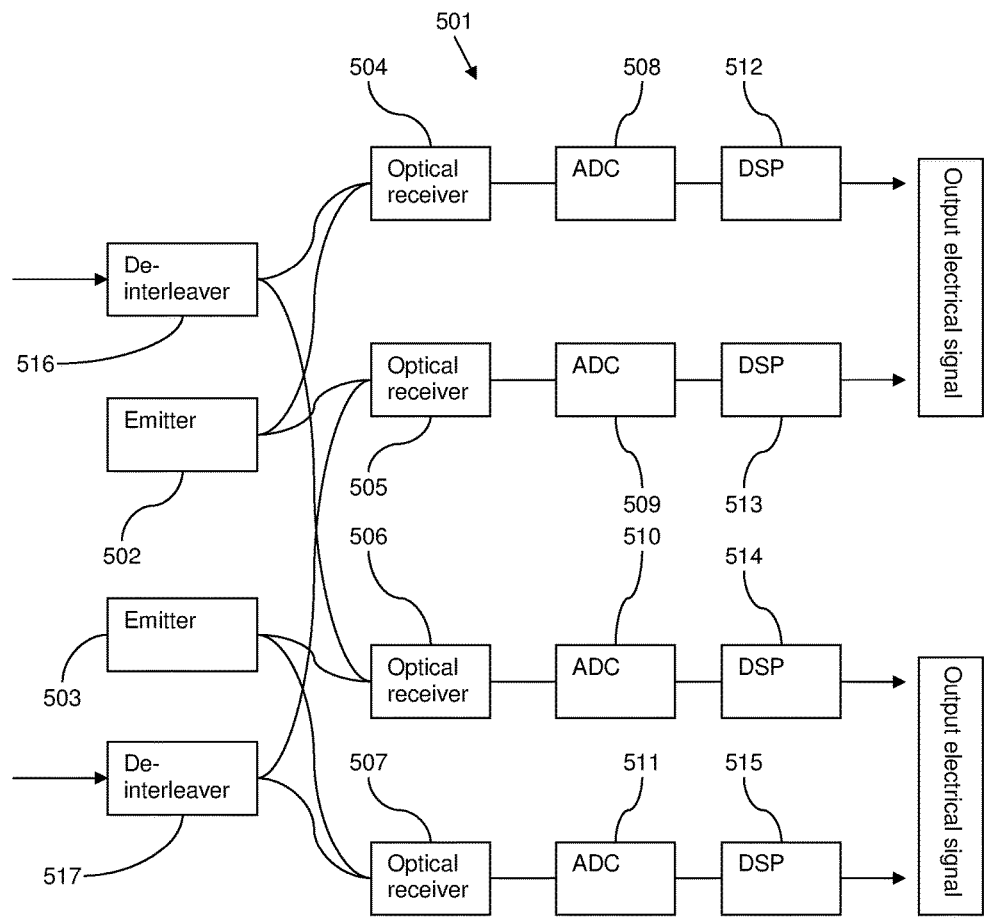
FIG. 5 is a schematic illustration of an alternative receiver device.

Similarly, a receiver device 501 is shown in FIG. 5 for separating and decoding signals at different polarisations. Two emitters 502, 503 transmit light at different wavelengths. The light from each emitter is split into two pathways and sent to a corresponding optical receiver 504, 505, 506, 507. De-interleavers 516, 517 receive signals at from optical fibres (not shown) and de-interleave subcarriers from the signals. In practice, a single signal containing two polarisations will be received and split into the two polarisation components. One of the components is rotated before insertion into its de-interleaver so that two separate signals at different wavelengths but the same polarisation are received by the two de-interleavers 516, 517. The subcarriers are sent to the optical receivers 504, 505, 506, 507. The optical receivers 504, 505, 506, 507 decode the subcarrier signals in combination with the light from the emitters 502, 503. The decoded signals are passed to ADCs 508, 509, 510, 511 and thence to DSPs 512, 513, 514, 505 for further processing.

Thus the invention, at least in preferred embodiments, provides a means of increasing channel density by transmitting in dual or multi-wavelength channels, and provides the PIC to achieve the dual channel modulated signal. This involves a quite simple modification to the transmit/modulator PIC with little extra real estate but can increase capacity by two or more.

The invention claimed is:

1. A transmitter device for transmitting an optical signal in the form of a plurality of subcarrier channels having different wavelengths, comprising:
   first and second optical carrier emitters for emitting light in first and second subcarriers at first and second frequencies or polarisations respectively;
   first and second modulators for modulating the first and second subcarriers with first and second modulation signals;
   an interleaver for interleaving the first and second modulated subcarriers into the optical signal; and first and second digital signal processing units for pre-emphasising the first and second modulation signals to compensate for a wavelength-dependent power transfer function of the interleaver.

2. The transmitter device of claim 1, wherein the interleaver is a Mach-Zehnder interleaver.

3. The transmitter device of claim 1, wherein the interleaver has a sinusoidal power transfer function.

4. The transmitter device of claim 1, wherein the first and second digital signal processing units are configured to pre-emphasise the signal such that the subcarrier channels in the optical signals have a substantially flat topped profile.

5. A receiver device for a receiving an optical signal in the form of a plurality of subcarrier channels having different wavelengths, comprising:
- a de-interleaver for receiving the optical signal and de-interleaving it into first and second subcarrier signals;
- first and second optical receivers, for receiving and decoding the first and second subcarrier signals respectively so as to generate first and second electrical signals; and
- first and second digital signal processing devices for processing the first and second electrical signals to compensate for a wavelength-dependent power transfer function of the de-interleaver.

6. The receiver device of claim 5, wherein the de-interleaver is a Mach-Zehnder de-interleaver.

7. The receiver device of claim 5, wherein the de-interleaver has a sinusoidal power transfer function.

8. A method of transmitting an optical signal in the form of a plurality of subcarrier channels having different wavelengths, comprising:
- generating light in first and second subcarriers at first and second frequencies or polarisations respectively;
- modulating the first and second subcarriers with first and second modulation signals;
- interleaving the first and second modulated subcarriers into the optical signal using an interleaver; and
- preemphasising the first and second modulation signals to compensate for a wavelength-dependent power transfer function of the interleaver.

9. A method of receiving an optical signal in the form of a plurality of subcarrier channels having different wavelengths, comprising:
- de-interleaving the signal into first and second subcarrier signals using a de-interleaver;
- decoding the first and second subcarrier signals respectively so as to generate first and second electrical signals; and
- processing the first and second electrical signals at digital signal processing components to compensate for a wavelength-dependent power transfer function of the de-interleaver.

* * * * *